United States Patent [19]

Pinschmidt, Jr. et al.

[11] 4,360,632

[45] Nov. 23, 1982

[54] KETONE BISULFITES AS REDUCING AGENT FOR FREE RADICAL POLYMERIZATION

[75] Inventors: Robert K. Pinschmidt, Jr., Allentown; Finn L. Marten, Macungie, both of Pa.

[73] Assignee: Air Products and Chemicals, Inc., Allentown, Pa.

[21] Appl. No.: 314,318

[22] Filed: Oct. 23, 1981

[51] Int. Cl.³ ............................................. C08L 23/02
[52] U.S. Cl. ..................................... 524/819; 526/94; 523/410; 524/808; 524/813; 524/832
[58] Field of Search .................. 526/94; 524/819, 808, 524/813, 832; 523/410

[56] References Cited

U.S. PATENT DOCUMENTS

| | | | |
|---|---|---|---|
| 2,383,055 | 8/1945 | Fryling | 260/84.5 |
| 2,560,694 | 7/1951 | Howard, Jr. | 260/80 |
| 2,716,107 | 8/1955 | Brown | 260/84.1 |
| 3,637,626 | 1/1972 | Mazzolini et al. | 260/85.5 |
| 3,700,456 | 10/1972 | Smith | 96/114 |
| 4,035,329 | 7/1977 | Wiest et al. | 524/819 |
| 4,094,849 | 6/1978 | Oyamada et al. | 260/29.6 |

*Primary Examiner*—Joseph L. Schofer
*Assistant Examiner*—N. Sarofim
*Attorney, Agent, or Firm*—Russell L. Brewer; E. Eugene Innis; James C. Simmons

[57] ABSTRACT

This invention relates to an improvement in a process for producing a latex containing dispersed polymer. The improvement in the process for polymerizing a reaction mixture of vinyl monomer, stabilizer, oxidizing agent and reducing agent comprises using a water-soluble ketone bisulfite as the reducing agent, either alone or with other reducing agents, the ketone having from 3 to 8 carbon atoms in the structure. During the polymerization, the ketone bisulfite is maintained in stoichiometric excess of the oxidizing agent. Vinyl acetate-ethylene copolymers are some of the preferred polymer systems produced.

12 Claims, No Drawings

KETONE BISULFITES AS REDUCING AGENT FOR FREE RADICAL POLYMERIZATION

BACKGROUND OF THE INVENTION

Emulsion polymer systems of butadiene-styrene, vinyl acetate-ethylene, acrylics and other vinyl monomers have been formulated into systems suited for making nonwoven binder systems. Typically, these systems will contain a cross-linkable monomer interpolymerized therein so that increased wet and dry strength and solvent resistance can be achieved by the nonwoven binder. Vinyl acetate-ethylene copolymer systems containing N-methylolacrylamide, ethers of the methylolamide or carboxyl functionality have been utilized in this field.

Heretofore, the industry has generally used a three-component redox initiator system for effecting polymerization of the monomers mentioned. These systems comprise a catalyst (oxidizing agent) such as t-butyl hydroperoxide, persulfates or hydrogen peroxide, an activator (reducing agent) such as an alkali metal bisulfite or an alkali metal formaldehyde sulfoxylate, and a transition metal ion moderator. One of the problems with such a system is that formaldehyde is present in the common reducing agents and is a cancer-suspect chemical. Thus, the industry is seeking ways to avoid its use in forming polymer systems used in the manufacture of nonwoven goods which come in contact with humans such as paper products, paper towels and baby diapers. Various initiator systems including formaldehyde free systems are described in the following patents.

U.S. Pat. No. 4,094,849 discloses a process for producing ethylene-vinyl acetate copolymer containing no formalin by emulsion polymerizing ethylene and vinyl acetate with a redox system consisting of an oxidizing agent, such as hydrogen peroxide or t-butyl hydroperoxide, and a reducing agent consisting of the reaction product of a glyoxal compound and an alkali metal, ammonium or zinc salt of a reductive sulphur oxide, e.g. a thiosulfuric acid, dithinous acid or a pyrosulfuric acid or bisulfite. Glyoxal bisulfite is specifically used as a reducing agent.

U.S. Pat. No. 2,716,107 discloses a process for producing synthetic rubber emulsions utilizing a redox system consisting of an iron salt, an alkali metal salt of ethylenediaminetetracetic acid, a peroxide, and a reducing agent consisting of an alkali metal ketone sulfoxylate. A mixture of acetone sulfoxylate-acetone bisulfite is used as the reducing agent and is formed by reacting acetone with sodium dithionite. The molar ratio of sodium acetone sulfoxylate to sodium acetone bisulfite produced by this reaction is 1:1. It was reported that the bisulfite did not interfere with the action of the sulfoxylate in accelerating the polymerization reaction rate and of itself did not have any appreciable polymerization accelerating action.

U.S. Pat. No. 3,637,626 discloses a process for polymerizing vinyl chloride utilizing an initiator consisting of an organic hydroperoxide, an alcoholate, an organic sulfite and sulfinic acid. Examples of organic sulfites include dimethyl and diethyl sulfite.

U.S. Pat. No. 2,560,694 discloses a process for polymerizing acrylonitrile using sodium bisulfite as the water-soluble reducing agent. Inorganic bisulfites, aliphatic aldehyde bisulfite adducts, sulfinites, inorganic thiosulfates and sulfoxylates and bromate ion where there is a molar excess of bromate ion, are effective catalysts for low temperature polymerization.

U.S. Pat. No. 3,700,456 discloses a process for producing photographic silver halide emulsions by polymerizing vinyl monomer in the presence of a redox system containing bromate or chlorate ion as the oxidant and a bisulfite reducing agent, e.g. potassium and sodium bisulfite.

U.S. Pat. No. 2,383,055 discloses a process for polymerizing conjugated dienes using a redox system where the reducing agent consists of sulfites, bisulfites, sulfoxylates, etc. Sulfur dioxide, sodium sulfite and sodium bisulfite are used as the reducing agents.

German Ausl. No. 2,456,576 describes the use of a bisulfite with a persulfate or t-butyl hydroperoxide in a continuous polymerization process for vinyl acetate-ethylene emulsions, but requires that the free monomer be below 15% and the bisulfite be used in 4-10 fold excess.

SUMMARY OF THE INVENTION

This invention relates to an improvement in a process for producing a latex containing polymer dispersed therein and is particularly suited for the generation of polymer systems designed for binder systems used in nonwoven applications. The improvement resides in a redox initiator system, and in particular, the reducing agent for the redox system. The reducing agent is formaldehyde-free and yet it permits excellent control of the polymerization without the customary yellowing or odor problems caused by many other formaldehyde-free systems. It works extremely well with ethylene-vinyl acetate monomer systems, even though these monomers are difficult to polymerize using many of the conventional redox systems. The reducing agent used in the redox system for initiating the polymerization of monomers is a water-soluble ketone bisulfite, the ketone having from 3-8 carbon atoms in the structure. Other reducing agents, e.g. ketone sulfoxylates, can be used with the ketone bisulfite, but the ketone bisulfite should be present in an amount greater than about 75% by weight. Preferably, the polymerization will be carried out in the absence of ketone sulfoxylate.

DESCRIPTION OF THE PREFERRED EMBODIMENTS

In accordance with the present invention, the latex can be formed in conventional manner by emulsion polymerizing vinyl monomers in an aqueous system. Representative vinyl monomers suited for forming the latexes include butadiene, styrene, vinyl acetate, ethylene, propylene, lower alkyl ($C_{1-6}$) esters of acrylic and methacrylic acid, acrylamide, methacrylamide, maleic anhydride, acrylic and methacrylic acid, acrylonitrile and the like. Typically, the polymers that are formed are interpolymers of one or more of these monomers and tailor-made for the end use application. Of the monomer systems, vinyl acetate and ethylene, optionally containing a functional monomer such as acrylic acid, are used. Other functional monomers include glycidyl acrylate, crotonic acid, itaconic acid, maleic acid and ethers of N-methylol acrylamide such as N-n-butoxymethylacrylamide; dimethylaminoethyl methacrylate, vinyl pyridine and isocyanate compounds such as vinyl isocyanate.

Typically, the functionl monomer will be present in a proportion from about 0.5 to 10%, and generally 1 to 5% based upon the weight of the polymer. Concentrations of ethylene in the copolymer will range from about 5% to 25%, and generally from about 15 to 20% by weight of the copolymer, thus giving a copolymer having a glass transition temperature from about +20° to −20° C. The vinyl acetate-ethylene copolymer systems are preferred as they lend themselves extremely well for the preparation of nonwoven goods used in the manufacture of baby diapers and paper towels.

Polymerization of the monomer systems is carried out at temperatures broadly from about 0° to 85° C., and generally from about 45° to 60° C. Temperatures are not critical as is well-known. Pressures from atmospheric to about 1500 psig are often used.

Emulsifying agents used in the polymerization system are those conventionally used and can include various water-soluble nonionic, anionic, cationic or ampholytic surfactants. Examples of suitable surfactants include, polyvinyl alcohol, polyoxyethylene condensates such as polyoxyethylene aliphatic ethers, polyoxyethylene nonylphenyl ethers and the like. Seed latexes can also be used as a stabilizing system. Various pH regulators and electrolytes are also used in conventional emulsion polymerization processes.

To effect polymerization of the vinyl monomers, a redox system containing an oxidizing agent and a reducing agent is used. Oxidizing agents conventionally used in redox systems are used in the polymerization here, and these include compounds having peroxide groups therein such as hydrogen peroxide, t-butyl hydroperoxide, cumene hydroperoxide, diisopropylbenzene hydroperoxide, potassium persulfate, ammonium persulfate and the like.

To control the generation of free radicals, a transition metal often is incorporated into the redox system, and such metals include an iron salt, e.g. ferrous and ferric chloride and ferrous ammonium sulfate. The use of transition metals and levels of addition to form a redox system for polymerization mediums are well-known.

In contrast to the prior art, the reducing agent which can be used by itself or in conjunction with another reducing agent in a redox system is a water-soluble ketone bisulfite where the ketone has from 3 to 8 carbon atoms in the structure. The ketone bisulfite can be formed by reacting a bisulfite such as sodium bisulfite with an aliphatic or cyclic ketone, e.g. acetone, methyl ethyl ketone, acetylacetone, methyl acetoacetate, cyclohexanone, acetol and 4-hydroxy-4-methyl-2-pentanone. All of these ketones are water-soluble, i.e. having a water-solubility of at least 1 gram per 100 grams of water at 25° C. Water-insoluble ketone bisulfites formed by reacting higher molecular weight hydrophobic ketones, e.g. undecanone, sucrose and 2-heptanone do not perform well in emulsion polymerization. Certain keto sugars, e.g. sucrose, which do not form stable bisulfite complexes, also perform poorly. The ketone bisulfites can be formed by reacting sodium bisulfite with the appropriate ketone at temperatures of from 0° to 70° C., but most conveniently, at ambient temperatures. Other techniques are also known. Preferably, the ketone bisulfite will be used by itself and thus in the absence of ketone sulfoxylate.

In carrying out the polymerization, active levels of water-soluble ketone bisulfites are maintained and, most advantageously, maintained in stoichiometric excess of the oxidizing agent, generally from 10-1,000%, preferably 100-500% molar excess. To keep active reducing agent in the system during the polymerization, it is generally necessary to add the reducing agent during the polymerization, particularly in the case of acetone bisulfite. Otherwise it will decompose and then either excessive quantities of oxidizing agent will be required or alternatively the redox catalyst system will be inoperative as is noted in the prior art.

One difficulty with some water-soluble ketone bisulfites is that they react extremely rapidly with the free radicals produced during the redox reactions. With many ketone bisulfites, e.g. acetone bisulfite, this leads to a very fast depletion of ketone bisulfite in the system. The depletion rate is, however, orders of magnitude lower than in the case where sodium bisulfite is used without the addition of a ketone. Because of the rapid depletion rate of ketone bisulfites, the side reaction mentioned above makes it necessary to monitor ketone bisulfite concentration to make sure it is active by maintaining it in stoichiometric excess or continuously fed to the reaction mixture in order to maintain the rate of reaction. When using a ketone bisulfite with a low deactivation rate, the ketone bisulfite may be added to the reaction vessel with the premix. When using a ketone bisulfite with a rapid deactivation rate, the polymerization can be performed in two ways to keep the reducing agent active, i.e., either by feeding the oxidizer and ketone bisulfite to the reactor continuously, or adding all of the oxidizer at time zero and feeding the ketone bisulfite during the polymerization. The feed rate of the limiting reactant will be the one controlling the rate of polymerization in the case of simultaneous continuous addition. The preferred way is adding the oxidizer and ketone bisulfite continuously, but addition being in such a manner that the oxidizer is the limiting reactant in the feed stream.

The rapid deactivation of the activator can in some cases provide an additional safety factor in commercial operation, even over other reducing agents such as formaldehyde sulfoxylates since, in the case of a temperature or other process upset, interrupting the addition of ketone bisulfite will rapidly stop initiation of the polymerization reaction.

Although not intending to be bound by theory, it is speculated that the rapid deactivation and loss of ketone bisulfite arises from the presence of a side reaction:

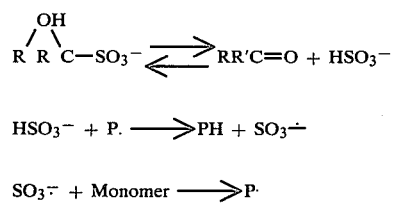

$$HSO_3^- + P\cdot \longrightarrow PH + SO_3^{\cdot -}$$

$$SO_3^{\cdot -} + Monomer \longrightarrow P\cdot$$

(where P· is an initiator or polymer radical). This reaction is formally a chain transfer process which consumes acetone or ketone bisulfite without net radical generation. Regardless of the validity of the proposed mechanism above, experience shows that acetone bisulfite is most favorably used in substantial stoichiometric excess over the oxidizing agent. Furthermore, it should be added continuously to maintain an effective level of reducing agent. Batch addition of even substantial stoichiometric excesses of acetone bisulfite does not produce sustained polymerization acceleration. Other ketone bisulfites (Table 1) appear to be required in smaller stoichiometric excess and also appear to be deactivated less rapidly by side reactions.

EXAMPLES

A vinyl acetate-copolymer emulsion suited for forming a formaldehyde-free nonwoven system was prepared in a 15 gallon stirred pressure reactor by first forming a premix having the following composition:

| Premix | |
|---|---|
| phosphate ester of ethoxylated nonylphenol (Dextrol OC-20) (3% based on emulsion solids) | 810 grams |
| ferrous sulfate.7 $H_2O$ | 2 grams |
| distilled water | 19 kg |
| sodium acetone bisulfite (formed by reacting 5.5 grams acetone with 9.0 grams sodium bisulfite in 210 ml $H_2O$ at ambient temperature The reaction is instantaneous and slightly exothermic) | |
| sodium acetate | 30 grams in 100 ml water |
| pH adjusted to 4.2 with ammonium hydroxide | |
| Monomer | |
| vinyl acetate | 21.6 kg |
| Comonomer | |
| acrylic acid | 1854 gm |
| distilled water | 2.78 kg |

The 21.6 kg vinyl acetate monomer and premix were charged to the reactor and ethylene added to pressurize to 500 psig (34 atm) at 30° C. At 500 psig ethylene addition was terminated, and the reactor contents were then heated to 50° C. with 225 rpm agitation. After thorough mixing, the reaction was initiated by introducing a 3% solution of t-butyl hydroperoxide prepared from 154 grams of 70% TBHP and 3.45 kg of water at a rate of about 3.7 ml/min. After initiation, the comonomer acrylic acid was added at a constant rate over a period of 2 hours. Polymerization was maintained by switching the reactor to demand control, i.e., the catalyst being added to maintain a temperature of from 46° to 50° C. with a jacket temperature in the range of from 20° to 40° C. Additional acetone bisulfite reducing agent consisting of the reaction product of 258 grams sodium bisulfite and 158 grams acetone dispersed in 6045 grams distilled water was introduced at a rate of 1350 ml per hour during the polymerization. (Total consumption of t-butyl hydroperoxide was 30.1 grams, and total consumption of acetone-bisulfite was 322 grams.) In four hours the vinyl acetate monomer concentration in the emulsion measured 1.5% based upon the emulsion. The end product had a Tg of −7° C. and was cross-linkable via the carboxyl functionality. The free formaldehyde was 3.4 ppm. Several advantages were noted with the emulsion besides the low formaldehyde content, e.g. absence of a yellow cast, as is present with many sulfite and sulfoxylate systems, and good rate of polymerization. Further, the reaction was carried out in the absence of ketone sulfoxylate or reducing agent other than the acetone bisulfite.

EXAMPLE 2

A comparative example was run in accordance with Example 1 using a premix of a 3% solution of ethoxylated nonylphenol sulfate and 0.5% sodium vinyl sulfonate. Hydrogen peroxide was used as the oxidizing agent and zinc formaldehyde sulfoxylate as the activator. A total of 13.8 grams hydrogen peroxide and 39.8 grams of zinc formaldehyde sulfoxylate were used to reduce vinyl acetate monomer content to 1.8%. The polymer Tg was 3° C. and the free formaldehyde in the resulting emulsion was 78 ppm.

This example shows that the free formaldehyde concentration for the formaldehyde sulfoxylate reducing agent is much higher, i.e. 78 ppm versus 3.4 for the acetone bisulfite system of Example I.

EXAMPLE 3

A vinyl acetate-ethylene copolymer similar to that produced in Example 1 was prepared in a stirred pressure reactor by first charging a mixture of 90 grams of an ethoxylated nonylphenol phosphate ester surfactant, 1300 grams of distilled water and 0.07 grams of ferrous sulphate.7$H_2O$ in the reactor. The pH of this premix was adjusted to 5.5 with ammonium hydroxide. A 1440 gram portion of vinyl acetate was charged to the reactor, and the reactor with the premix was purged with nitrogen two times to remove oxygen and then pressurized with ethylene to 635 psig (43.2 atm) at 50° C. A reducing agent mix consisting of the reaction product of 11.6 grams acetone and 19.8 grams sodium bisulfite in 408 grams distilled water was prepared and 5 ml of this mix added to the reactor. The polymerization was initiated by feeding in a solution of 3% t-butyl hydroperoxide in water to the reactor. The reducing agent mix was continuously fed into the reactor at a rate of about 1 to 1½ ml/minute and the rate of oxidizing agent was controlled to maintain the desired reaction temperature. A 53 gram portion of acrylic acid was added at constant rate as a 50% solution in water over 1¾ hour. At 3½ hours after initiation the vinyl acetate content in the reaction mixture was about 1.3%. Reaction control was excellent and little discoloration of product was noted. The product was essentially formaldehyde-free.

EXAMPLES 4-8

The procedure of Example 3 was repeated except that various ketones were used in place of acetone to prepare the reducing agent mix.

As shown on Table 1, these ketone bisulfites were also effective in initiating the polymerization with t-butyl hydroperoxide. In several cases, hydrogen peroxide also functioned as the catalyst. Several systems initiated efficiently with reduced excesses of ketone bisulfite or when the reducing agent delay was interrupted, indicating slower reducing agent deactivation than with acetate bisulfite. In all cases, the ketone bisulfite remained active.

TABLE 1

| Example | Ketone | Reducing Agent (mmol)[1] | Initiator (mmol)[1] | Comments |
|---|---|---|---|---|
| 4 | Cyclohexanone | 123.3 | 51.9 | *Ran without continuous reducing agent sluggish with $H_2O_2$ |
| 5 | Methylethyl ketone | 113 | 18.8 | Good response; ran well with 1:2 mole ratio oxidizer/reducing agent |
| 6 | Methyl Acetoacetate | 78.4 | 31.4 | Ran at 1:2 mole ratio |

TABLE 1-continued

| Example | Ketone | Reducing Agent (mmol)[1] | Initiator (mmol)[1] | Comments |
|---|---|---|---|---|
| 7 | Acetol | 55.6 | 27.4 | oxidizer/reducing agent; $H_2O_2$ also worked except at low vinyl acetate levels *Ran without continuous reducing agent, better with TBHP than $H_2O_2$ |
| 8 | 4-hydroxy-4-methyl-pentanone | 46.7 | 13.1 | ran well - odor problem |

*Apparently these bisulfites have a much slower deactivation rate than acetone bisulfite.
[1]Consumption to 5% unreacted vinyl acetate

EXAMPLE 9

Bisulfite Reducing Agent Without Ketone

An emulsion was prepared with the recipe as in Example 3 but using the procedure of West German Ausl. No. 2,456,576 using a mixture of nonionic surfactants as emulsifying agents. Acrylic acid was added during polymerization to provide about 5% by weight based upon copolymer. About 1070 g of the total 1207 g vinyl acetate charge was added over 3 hours to maintain free monomer below 15% (as required by West German Ausl. No. 2,456,576). The reaction was initiated at 25° C. and the temperature was increased over 1 hour to 50° C. Sodium bisulfite and t-butyl hydroperoxide use were 282 mmol and 70 mmol, respectively, to obtain the 5% residual vinyl acetate level. An exotherm could not be maintained with hydrogen peroxide. The product had exceptionally poor performance properties in a nonwoven application.

EXAMPLES 10–11

These samples were prepared as in Example 1 but stabilized with a mixture of ethoxylated nonylphenol nonionic surfactant and sodium vinyl sulfonate (SVS). (SVS copolymerizes with vinyl acetate, ethylene and acrylic acid during the reaction to a surfactant-like stabilizer). Example 10 used acetone bisulfite as the reducing agent, and Example 11 used glyoxal bisulfite as the reducing agent (in a 2:1 molar ratio with t-butyl hydroperoxide). Both emulsions were prepared in multiple batches, blended and padded to 50% add-on on a lightly bonded RANDO polyester web with and without 0.7% $NH_4Cl$ and cured at 300° F. in an oven. Table II web brightness measurements performed with a Gardner Tappi Brightness Meter show considerably greater discoloration in the glyoxal bisulfite case.

TABLE II

| Example | Initiator | Cure Time (min.) | % $NH_4Cl$ | Brightness |
|---|---|---|---|---|
| Ex. 10 | Acetone Bisulfite | 5 | — | 84.8 |
| Ex. 10 | Acetone Bisulfite | 5 | 0.7 | 85.2 |
| Ex. 10 | Acetone Bisulfite | 15 | — | 71.0 |
| Ex. 11 | Glyoxal Bisulfite | 5 | — | 79.1 |
| Ex. 11 | Glyoxal Bisulfite | 15 | — | 63.6 |

EXAMPLE 12

The basic recipe shown below was used for testing the importance of the acetone/sodium bisulfite ratio, the feed rate of acetone/bisulfite to the reactor, and the advantages of using either the reducing agent or oxidizing agent as the control.

Vinyl acetate-ethylene emulsions were prepared in a stirred reactor by first charging a mixture of:

| Premix | |
|---|---|
| Distilled $H_2O$ | 720 grams |
| Alipal CO-433 surfactant | 212 grams |
| $FeSO_4.7H_2O$ | 0.13 grams |
| Sodium vinyl sulfonate | 37.5 grams |
| Sodium acetate | 1.9 grams |
| Reducing agent | variable |
| Vinyl acetate | 1512.0 grams | pH was adjusted to 3.5 using acetic acid.

| Comonomer Delay | |
|---|---|
| Acrylic acid | 56.8 grams |
| Distilled $H_2O$ | 227.2 grams |
| Reducing Agent Delay | |
| Sodium bisulfite | 17.2 grams |
| Acetone | 0–15.75 grams |
| Distilled $H_2O$ | 397.8–412.8 grams |
| Catalyst Delay | |
| tert-butyl hydroperoxide (70%) | 14.7 grams |
| Distilled $H_2O$ | 327.0 grams |

The premix was charged to the reactor and ethylene add to pressurize to 470 psig (32 atm) at 25° C. The ethylene addition was terminated at 470 psig and the contents of the reactor were then heated to 50° C. The reaction was initiated by either introducing the t-butyl hydroperoxide solution or reducing agent solution depending on the control mode. The reducing agent and catalyst delays were started simultaneously in all cases. The acrylic acid delay was started as soon as initiation had been observed. The acrylic acid delay time was 2.5 hours. The polymerization was maintained by switching the reactor to demand control to maintain a temperature of 46°–50° C. with a jacket temperature in the range from 20° to 40° C. The amounts of catalyst and reducing agent usage, as well as the effectiveness of the control as a function of the acetone/sodium bisulfite ratio, the addition rate, and the mode of control are shown below in Table III.

TABLE III

| Run No. | Molar Ratio Acetone/$Na_2S_2O_5$ | $Na_2S_2O_5$ initial charge (g) | Acetone in initial charge (g) | Final concentration of vinyl acetate % | Acetone (g) | $Na_2S_2O_5$ (g) | t-BHP (g) | Reducing Agent flow rate ml/min | Oxidizing Agent flow rate ml/min | Control |
|---|---|---|---|---|---|---|---|---|---|---|
| Catalyst Control: | | | | | | | | | | |
| 1 | 3.0 | 0.61 | 0.56 | 1.7 | 10.3 | 11.2 | 5.6 | 0.95 | — | Acceptable |
| 2 | 1.0 | 0.61 | 0.19 | 1.6 | 3.5 | 11.4 | 3.4 | 0.95 | — | Acceptable |
| 3 | 3.0 | 11.9 | 10.9 | 50 | 10.9 | 11.9 | 1.8 | 0 | — | Poor |
| 4 | 2.0 | 5.9 | 3.63 | 1.4 | 5.9 | 9.6 | 10.5 | 0.50 | — | Poor |
| 5 | 2.0 | 0.61 | 0.37 | 2.2 | 6.5 | 10.7 | 4.6 | 0.95 | — | Excellent |
| 6 | 2.0 | 0.61 | 0.37 | 1.5 | 6.2 | 10.1 | 6.1 | 0.95 | — | Acceptable |
| 7 | 2.0 | 0.61 | 0.37 | 1.9 | 7.9 | 12.9 | 2.7 | 1.5 | — | Excellent |
| 8 | 1.0 | 0.61 | 0.19 | 1.8 | 3.6 | 11.7 | 3.8 | 1.5 | — | Acceptable |
| 9 | 0 | 0.88 | 0 | 1.8 | 0 | 27.1 | 6.3 | 3.1 | — | Very Poor |
| Reducing Agent Control: | | | | | | | | | | |
| 10 | 1.0 | 5.9 | 1.82 | 1.5 | 3.6 | 11.8 | 5.3 | — | 0.6 | Acceptable |
| 11 | 0 | 0 | 0 | 1.8 | 0 | 16.9 | 2.8 | — | 0.4 | Very Poor |

Excellent: Polymerization rate responds rapidly and predictably to limiting reagent addition rate changes. Can be run totally on automatic control.
Acceptable: Rate responds well to addition rate changes under most circumstances, but may require manual override to maintain reaction.
Poor: No or very sluggish response to even gross changes in limiting reagent addition rate - not acceptable for commercial operation.

As can be seen from Table III, when all of the acetone bisulfite is added initially (Run 3), the reaction stops very rapidly with minimal monomer conversion. From Run 9 and Run 11 using sodium bisulfite alone, catalyst consumption was high and polymerization rate control was very erratic. Run 10 shows that the reaction could be run on reducing agent control, but at 100% increase in catalyst consumption.

STATEMENT OF INDUSTRIAL APPLICATION

This invention relates to a reducing agent for a redox catalyst system useful in free radical polymerization of vinyl monomers, particularly vinyl acetate and ethylene. The reducing agent permits the formation of aqueous polymer emulsions with low formaldehyde content.

What is claimed is:

1. In a process for producing a latex containing a dispersed polymer therein by polymerizing a reaction mixture containing vinyl monomer, water, stabilizer and a catalyst consisting of oxidizing agent, a reducing agent and a transition metal salt, the improvement which comprises
using a water-soluble ketone bisulfite as a component of said reducing agent, said ketone having from 3 to 8 carbon atoms in the structure and said ketone bisulfite being present in an amount greater than 75% by weight of said reducing agent.

2. The process of claim 1 wherein a stoichiometric excess of reducing agent based upon oxidizing agent is maintained in said reaction mixture during said polymerization.

3. The process of claim 1 in which a stoichiometric excess of oxidizing agent, based upon reducing agent, is maintained in said reaction mixture during said polymerization.

4. The process of claim 1 wherein said polymer is a copolymer of ethylene and vinyl acetate and said copolymer has a Tg of from −20° to 20° C.

5. The process of claims 2, 3 or 4 wherein said ketone bisulfite is acetone bisulfite.

6. The process of claim 3 wherein said water-soluble ketone bisulfite is added during the polymerization.

7. The process of claim 2 wherein the concentration of sulfite ion is at least 10–1,000% in molar excess of the stoichiometric requirement for the oxidizing agent.

8. The process of claim 4 wherein the said ketone bisulfite is butanone bisulfite.

9. The process of claim 4 wherein the said ketone bisulfite is cyclohexanone bisulfite.

10. The process of claim 4 wherein the said ketone bisulfite is acetoacetate bisulfite.

11. The process of claim 1 wherein a transition metal is incorporated into the reaction.

12. The process of claim 1 wherein said reducing agent is acetone bisulfite and the polymerization is carried out in the absence of ketone sulfoxylate.

* * * * *